(12) United States Patent
Burke

(10) Patent No.: US 9,192,144 B2
(45) Date of Patent: *Nov. 24, 2015

(54) PORTABLE WEARABLE ANIMAL WASTE COLLECTION AND DISPOSAL DEVICE, SYSTEM AND METHOD OF USE THEREOF

(71) Applicant: Nancy Burke, Oneonta, NY (US)

(72) Inventor: Nancy Burke, Oneonta, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,195

(22) Filed: Aug. 9, 2013

(65) Prior Publication Data

US 2014/0062108 A1      Mar. 6, 2014

Related U.S. Application Data

(63) Continuation-in-part of application No. 13/599,305, filed on Aug. 30, 2012, now Pat. No. 8,534,725.

(51) Int. Cl.
*A01K 29/00* (2006.01)
*A01K 23/00* (2006.01)

(52) U.S. Cl.
CPC ................................. *A01K 23/005* (2013.01)

(58) Field of Classification Search
CPC .................. E01H 1/1206; E01H 2001/1286; A01K 23/005
USPC ............... 294/1.3–1.5; 119/161; 15/257.1; 224/219, 904, 920, 665–668, 679
See application file for complete search history.

(56) References Cited

U.S. PATENT DOCUMENTS

| | | | |
|---|---|---|---|
| 3,380,307 A | 4/1968 | De Frank | |
| 3,868,135 A * | 2/1975 | Magliaro | 294/1.5 |
| 3,872,831 A | 3/1975 | Cassidy | |
| 3,937,509 A | 2/1976 | Hufnagel | |
| 4,042,269 A * | 8/1977 | Skermetta | 294/1.5 |
| 4,102,547 A * | 7/1978 | Williams | 294/1.3 |
| 4,149,745 A * | 4/1979 | Willis | 294/1.4 |
| 4,262,948 A | 4/1981 | Emme | |
| 4,325,503 A * | 4/1982 | Swinney | 224/148.6 |
| 4,852,924 A * | 8/1989 | Ines | 294/1.5 |
| D310,436 S | 9/1990 | Krauth | |
| 5,060,835 A | 10/1991 | Payne | |
| 5,156,427 A * | 10/1992 | Longrie et al. | 294/1.3 |
| 5,403,050 A | 4/1995 | Searing | |
| 5,447,227 A | 9/1995 | Kosberg | |
| 5,586,521 A * | 12/1996 | Kelley | 119/858 |
| 5,713,616 A | 2/1998 | Knudson | |
| D429,040 S * | 8/2000 | Schmittgens et al. | D30/162 |
| 6,129,096 A | 10/2000 | Johnson | |
| 6,199,737 B1 | 3/2001 | Ringelstetter | |
| 6,241,135 B1 | 6/2001 | Thatcher | |

(Continued)

OTHER PUBLICATIONS

Notice of Allowance (Mail Date Jul. 11, 2013) for U.S. Appl. No. 13/599,305, filed Aug. 30, 2012; Confirmation No. 1043.

(Continued)

*Primary Examiner* — Dean Kramer

(74) *Attorney, Agent, or Firm* — Schmeiser, Olsen & Watts, LLP

(57) ABSTRACT

A wearable animal waste collection device comprising a wearable structure configured to be worn by a user, the wearable structure including an attachment portion for removably engaging a direct collection device wherein the direct collection device is configured to directly collect an animal waste before the animal waste reaches a ground surface is provided. An associated method is also provided.

20 Claims, 15 Drawing Sheets

(56) References Cited

U.S. PATENT DOCUMENTS

| | | |
|---|---|---|
| 6,257,473 B1 | 7/2001 | Ringelstetter |
| D453,067 S | 1/2002 | Cody |
| 6,942,264 B1 | 9/2005 | Mendez |
| 7,073,462 B1 | 7/2006 | Layman |
| 7,128,352 B1 | 10/2006 | Phippen |
| 7,267,381 B2 | 9/2007 | Cafferty et al. |
| 7,543,726 B2 * | 6/2009 | MacNaughton ............. 224/679 |
| 7,588,273 B2 | 9/2009 | Tittemore |
| D613,915 S | 4/2010 | Plotkin |
| D617,061 S * | 6/2010 | Su ................................ D30/162 |
| 7,854,455 B2 | 12/2010 | Ruscil et al. |
| 7,954,868 B1 | 6/2011 | Van Pelt |
| 8,123,266 B1 | 2/2012 | Jone et al. |
| 8,534,725 B1 * | 9/2013 | Burke ............................ 294/1.5 |
| 2004/0189026 A1 * | 9/2004 | Denham et al. ................ 294/1.3 |
| 2005/0263087 A1 | 12/2005 | Livingston, III |
| 2006/0118587 A1 * | 6/2006 | Rees et al. .................... 224/666 |
| 2009/0045639 A1 | 2/2009 | Shalhoub |
| 2009/0096227 A1 | 4/2009 | Pender et al. |
| 2010/0006040 A1 | 1/2010 | Valliant |
| 2010/0026022 A1 * | 2/2010 | Welch |
| 2010/0072765 A1 | 3/2010 | Granado |
| 2010/0164240 A1 * | 7/2010 | Moore .......................... 294/1.3 |
| 2011/0057463 A1 | 3/2011 | Chen |
| 2011/0132952 A1 | 6/2011 | Peterson-Malesci |
| 2011/0254296 A1 * | 10/2011 | Chavez .......................... 294/1.3 |

OTHER PUBLICATIONS

Office Action (Mail Date Apr. 5, 2013) for U.S. Appl. No. 13/599,305, filed Aug. 30, 2012; Confirmation No. 1043.

* cited by examiner

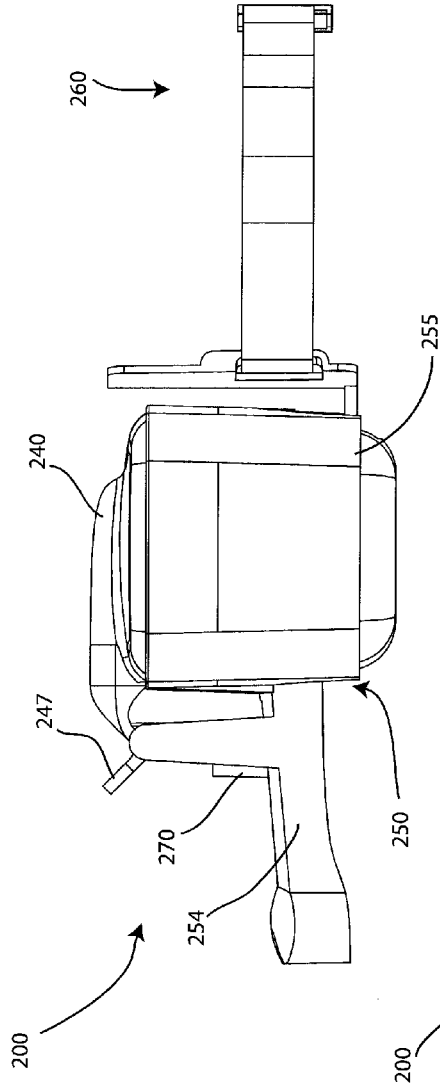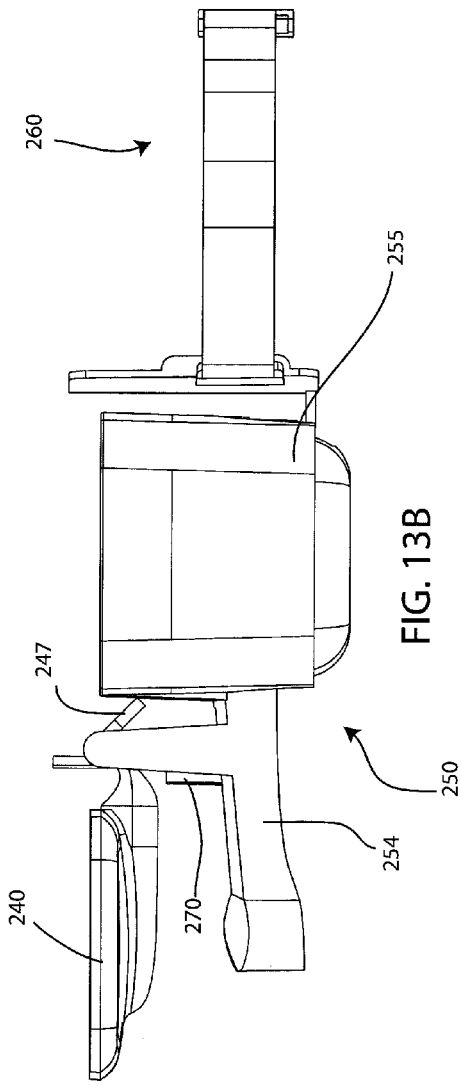
FIG. 13A
FIG. 13B

PORTABLE WEARABLE ANIMAL WASTE COLLECTION AND DISPOSAL DEVICE, SYSTEM AND METHOD OF USE THEREOF

CROSS-REFERENCE TO RELATED TECHNOLOGY

This application is a continuation-in-part of U.S. application Ser. No. 13/599,305, filed Aug. 30, 2012, and entitled "Portable Wearable Animal Waste Collection and Disposal Device, System and Method of Use Thereof."

FIELD OF TECHNOLOGY

The following relates to collecting and disposing animal waste and more specifically to embodiments of a wearable device and system for collection and temporary storage of animal waste.

BACKGROUND

A pet is like a member of the family, and can bring many joys in their owners' everyday lives. However, owning a pet carries many responsibilities, including cleaning up after the pet after a bowel movement, and taking the pet outside for occasional or frequent walks or laps in the backyard. Most often pets relieve themselves outdoors, especially when the owner or dog-walker is walking the dog around the block. In the event the pet does have a bowel movement while out on a walk, or somewhere outdoors, the dog-walker is responsible for picking up and removing the waste. Picking up and removing the animal waste typically requires the dog-walker to bend down and grab the feces with their hand covered in a plastic bag, which is a distasteful task for many people. Sometimes, a portion of the feces (especially with a loose bowel movement) remains on the ground/sidewalk after it is picked up, which may make contact with pedestrians' shoes, and is also unsanitary. The plastic bag sometimes tears causing a spill of the animal waste. Moreover, pets sometimes defecate more than once at different locations, which forces the dog-walker to reuse the plastic bag that has already been folded inside out to avoid touching the feces. In other words, it is distasteful to pick up animal waste and it is very difficult to pick up the animal waste more than once using a plastic without exposure to unsanitary conditions.

Thus, a need exists for an apparatus, system, and method for direct animal waste collection and disposal, capable of multiple uses without exposure to unsanitary conditions.

SUMMARY

A first aspect relates generally to a wearable animal waste collection device comprising a wearable structure configured to be worn by a user, a first securing means attached to the wearable structure, the first securing means structured to removably accommodate a top cover portion, and a second securing means attached to the wearable structure, the second securing means structured to removably accommodate a direct collection device, wherein the direct collection device directly collects an animal waste before the animal waste reaches a ground surface.

A second aspect relates generally to a wearable animal waste collection device comprising a wearable structure configured to be worn around a waist of a user, a top cover portion secured by a first securing means when in a first position, the first securing means attached to the wearable structure, and a direct collection device having a rigid collection portion and a rigid handle portion, the direct collection device being secured by a second securing means when in the first position and a second position, wherein the second securing means is attached to the wearable structure, wherein the top cover portion is placed into engagement with the rigid collection portion in the second position.

A third aspect relates generally to a method of animal waste collection comprising providing a wearable animal waste collection device comprising a wearable structure configured to be worn around a waist of a user, a top cover portion secured by a first securing means attached to the wearable structure, and a direct collection device having a rigid collection portion and a rigid handle portion, the direct collection device being secured by a second securing means attached to the wearable structure, wherein an animal waste is collected with the direct collection device before the animal waste reaches a ground surface, wherein the animal waste is temporarily stored in the rigid collection portion of the direct collection device.

A fourth aspect relates generally to a wearable animal waste collection device comprising: a wearable structure configured to be worn by a user, the wearable structure including an attachment portion for removably engaging a direct collection device, wherein the direct collection device is configured to directly collect an animal waste before the animal waste reaches a ground surface.

A fifth aspect relates generally to a wearable animal waste collection device comprising: a wearable structure configured to be worn around a waist of a user, wherein the wearable structure includes: an attachment portion having a first surface and a second surface, and a connection portion attached to the attachment portion, the connection portion having an engagement surface extending from the second surface of the attachment portion; a direct collection means removably secured to the wearable structure, wherein the direct collection means includes: a collection portion configured to store animal waste, a handle portion attached to the collection portion, a top cover hingedly connected to the collection portion, and a locking means for locking and unlocking the top cover.

A sixth aspect relates generally to a method of animal waste collection comprising: providing a wearable structure configured to be worn by a user, the wearable structure including an attachment portion for removably engaging a direct collection device, wherein an animal waste is temporarily stored in a rigid collection portion of the direct collection device.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein:

FIG. 13A depicts a side view of the second embodiment of a wearable animal waste collection device in a closed position;

FIG. 13B depicts a side view of the second embodiment of a wearable animal waste collection device in an open position;

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
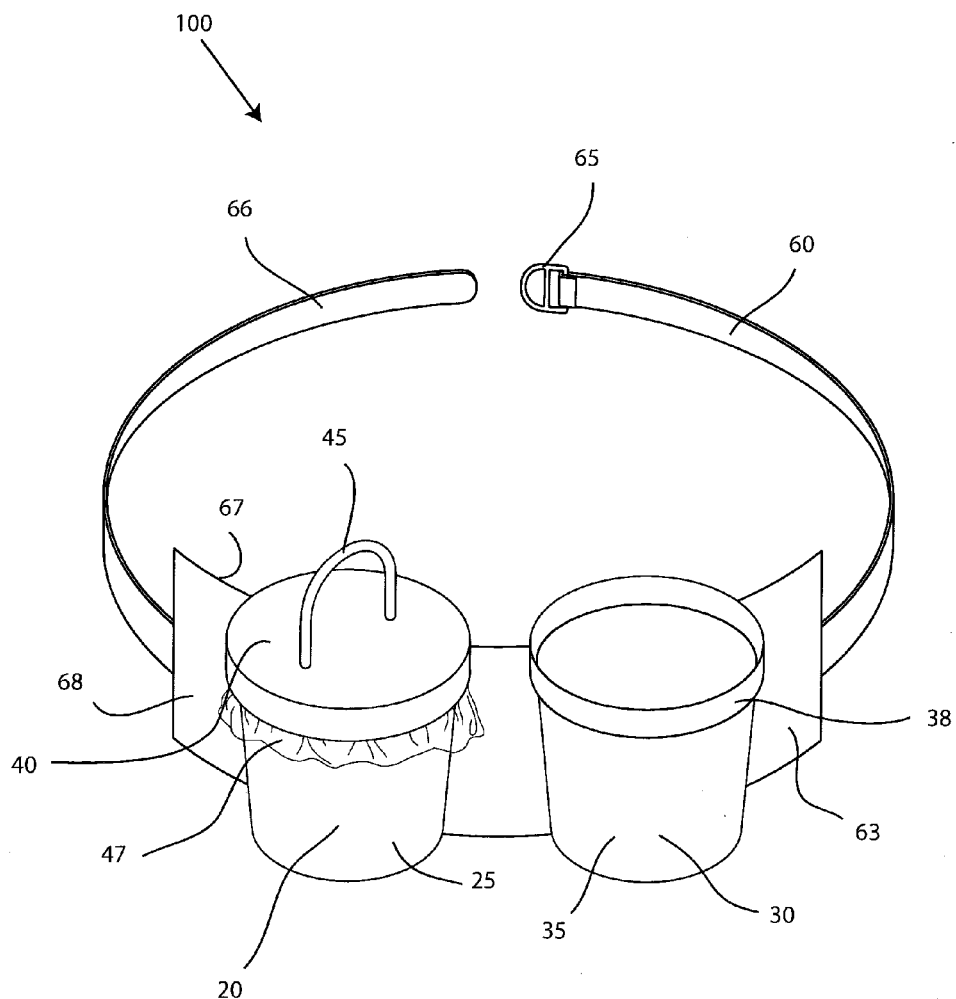
FIG. 1 depicts a perspective view of an embodiment of a wearable animal waste collection device.

Referring to the drawings, FIG. 1 depicts an embodiment of a wearable animal waste collection device 100. Embodiments of the wearable animal waste collection device 100 may be a portable dog toilet for convenient and sanitary collection of animal waste. Embodiments of the wearable animal waste collection device 100 may be worn by a user 10. User 10 may be a human being, a pet owner, a dog-walker, an adult, a child, or any person having a torso to accommodate, wear, support, carry, etc., the wearable animal waste collection device 100. However, the wearable animal waste collection device 100 may be attached to an inanimate object, such as a baby stroller, bike, or any structure capable of accommodating, wearing, carrying, supporting, etc., the wearable animal waste collection device 100. Moreover, embodiments of the wearable animal waste collection device 100 may be worn by a user 10 while outdoors in a presence of an animal, wherein the animal could have a bowel movement. Embodiments of an animal may include a pet, such as a dog, cat, pig, fox, and the like, or any domesticated or trained animal where a user 10 is responsible for cleaning up after the animal. In most embodiments, the wearable animal waste collection device 100 worn by the user 10 is to responsibly, conveniently, and sanitarily collect, temporarily store, and dispose of dog feces. Accordingly, the wearable animal waste collection device 100 may be worn by the user 10 while out walking an animal, such as a dog, and not have to worry about a collection means for animal waste on other's property.

Referring still to FIG. 1, embodiments of the wearable animal waste collection device 100 may include a wearable structure 60, a first securing means 20, a second securing means 30, and a direct collection means 50. Embodiments of the wearable animal waste collection device 100 may include a wearable structure 60 configured to be worn by a user 10, a first securing means 20 attached to the wearable structure 60, the first securing means 20 structured to removably accommodate a top cover portion 40, and a second securing means 30 attached to the wearable structure 60, the second securing means 30 structured to removably accommodate a direct collection device 50, wherein the direct collection device 50 directly collects an animal waste before the animal waste reaches a ground surface. Further embodiments of the wearable animal waste collection device 100 may include a wearable structure 60 configured to be worn around a waist of a user 10, a top cover portion 40 secured by a first securing means 20 when in a first position, the first securing means 20 attached to the wearable structure 60, and a direct collection device 50 having a rigid collection portion 55 and a rigid handle portion 54, the direct collection device 50 being secured by a second securing means 30 when in the first position and a second position, wherein the second securing means 30 is attached to the wearable structure 60, wherein the top cover portion 40 is placed into engagement with the rigid collection portion 55 in the second position.

Embodiments of the wearable animal waste collection device 100 may include a wearable structure 60. Embodiments of the wearable structure 60 may be a structure or article that can be worn by a user 10, or releasably fastened to an object. Embodiments of the wearable structure 60 may be adjustable to accommodate users of different sizes. Embodiments of the wearable structure 60 may include a band portion 66 having a fastening means 65 attached to at least one end of the band portion 66. Embodiments of the band portion 66 may be configured to extend around a user's torso proximate the hips of the user 10 when being worn by the user 10. Embodiments of the band portion 66 may be a band, a strap, a belt, a flexible band, a flexible strap, a web band, a woven cloth band, nylon band, or a section of material configured to be wrapped around a torso of a user 10. The band portion 66 may have various lengths, widths, and thicknesses, and may be comprised of various materials. For instance, embodiments of the band portion 66 may be made of a heavy cloth, leather, plastic, nylon, string(s), or a combination thereof, may be approximately 1" wide. One end of the band portion 66 may include a fastening means 65, wherein the fastening means 65 cooperates with the other end of the band portion 66 to releasable secure or fasten the wearable structure 60 to the user 10 or an object. In an exemplary embodiment, the ends of the band portion 65 join together and are releasably fastened by the fastening member 65 in front of the user's abdomen. Embodiments of the fastening means 65 may be a conventional belt buckle, a heel roller buckle, a loop and hook buckle, a clamp buckle, a box frame buckle, a two ring fastener, and the like.

Furthermore, embodiments of the wearable structure 60 may include an attachment portion 63. Embodiments of the attachment portion 63 may be a structure or section of material that can both spaciously accommodate and physically support the mounting of additional components of the wearable animal waste collection device 100 to the wearable structure 60. Embodiments of the attachment portion 63 may be attached, fastened, adhered, affixed, joined, and the like, to the band portion 66. Alternatively, the attachment portion 63 may be integral to the band portion 66. The attachment portion 63 may be comprised of the same material as the band portion 66, or may be comprised of a different material than the band portion 66. For instance, the attachment portion 63 may be a plastic sheet-like structure affixed to a leather, nylon, cotton, or woven cloth band portion 66. Further embodiments of the attachment portion 63 may include a combination of a conformal material, such as a plastic or rubber to conform to the user's back or hips, and a harder plastic for the mounting of the first and second securing means 20, 30. Embodiments of the attachment portion 63 may be located proximate or otherwise near a center location between the ends of the band portion 66; however, the attachment portion 63 may be located at any point along the band portion 66. The location of the attachment portion 63 can be adjustable, slidably or otherwise, for repositioning of the attachment portion 63 to adjust to different shapes and sizes of the user, provide easier access to the direct collection device 50, and overall comfortability of the user 10. Embodiments of the attachment portion 63 may have an increased width and thickness of the band portion 66, and the thickness and width may vary depending on the weight of the additional components of the wearable animal waste collection device 100, including the direct collection device 50. In one embodiment, a width measured horizontally across the attachment portion 63 may be between 13" and 17". In another embodiment, a width measured horizontally across the attachment portion 63 may be 15.5" Further, an embodiment of a length measured vertically across the attachment portion 63 may be between 4" and 7". In another embodiment, a length measured vertically across the attachment portion 63 may be 6.25". Those skilled in the art should appreciate that the dimensions of the attachment portion 63 may vary to accommodate various design specifications and practical requirements, such as the size of the user 10 or a size of the animal. Moreover, embodiments of the attachment portion 63 may be configured to provide a surface for the mounting of a first securing means 20 and a second securing means 30. In other words, embodiments of the attachment portion 63 of the wearable structure 60 may include a first surface 67 and a second surface 68, wherein the first surface 67 may be configured to rest against a back or portion of the user 10 and the second surface 68 may be a mounting surface configured to accept, accommodate, engage, etc., the first and securing means 20, 30.

Figure 2A:
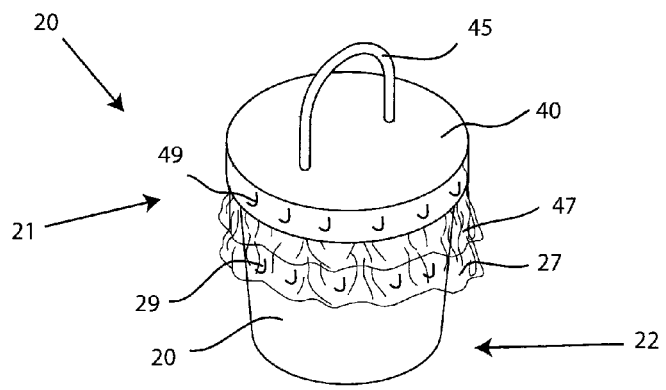
FIG. 2A depicts a perspective view of a first embodiment of a first securing means.
Figure 2B:
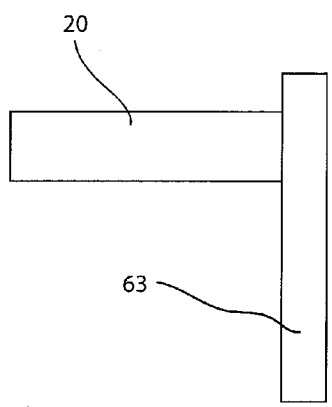
FIG. 2B depicts a side view of a second embodiment of the first securing means.
Figure 2C:
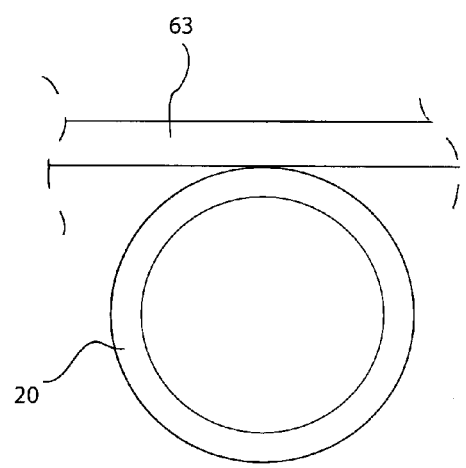
FIG. 2C depicts a top view of a second embodiment of the first securing means.

With continued reference to FIG. 1, and with additional reference to FIG. 2, embodiments of the wearable animal waste collection device 100 may include a first securing means 20, or first securing portion 20. Embodiments of the first securing means 20 may be configured to removably secure, support, hold, accommodate, carry, etc., a top portion 40, the top cover portion 40 configured for placement onto the direct collection device 50 to cover the collected animal waste, described in greater detail infra. Embodiments of the first securing portion 20 may be attached, affixed, fastened, mounted, adhered, joined, etc. to the wearable structure 60. Embodiments of the first securing means 20 may be directly attached to the attachment portion 63 of the wearable structure 60. Alternatively, the first securing means 20 may be attached directly to the band portion 66. Embodiments of the first securing means 20 may be a structure configured to releasably hold the top cover portion 40. In one embodiment, the first securing means 20 may be a cup-like device having a top end 21 and a bottom end 22, and a body 25 defining the first securing means 20 between the top end 21 and the bottom end 22. Thus, the top cover portion 40 may be placed onto a top end 21, which may hold, support, releasably engage, etc., the top cover portion 40 until the top cover portion 40 is needed. Embodiments of the cup-like first securing means 20 may have a volume or space within the body 25 for storage of items, such as replacement liners, cell phone, keys, and the like. In another embodiment, as shown in FIGS. 2B and 2C, the first securing means 20 may be a ring-like structure that protrudes from the second, mounting surface 68 of the attachment portion 63 to support the top portion 40. For example, instead of the first securing means 20 being comprised of a top end 21, a bottom end 22, and a body 25 having volume therebetween, embodiments of the first securing means 20 may simply include a solid ring having a diameter slightly smaller than the top portion 40 to accommodate, hold, releasably engage, etc., the top portion 40. The first securing means 20 may be available in different sizes, depending on the size of the wearable structure 60 or the size of the animal. In one embodiment, the first securing means 20 may have a largest diameter between 3" and 5", and a height between 2" and 5".

Moreover, embodiments of the first securing means 20 may be lined with a disposable plastic liner 27 to protect or prevent contact between animal feces and the first securing means 20. The disposable liner 27 may fit within the first securing means 20, wherein a portion of the disposable liner 27 extends beyond and outside the first securing means 20. The portion of the disposable liner 27 extending outside the first securing means 20 may interact with a plurality of hook members 29 located along an outer surface or rim of the first securing means 20. For instance, the disposable liner 27 may be fastened to the outer surface of the first securing means 20 by gripping the liner 27 and stretching or placing it into contact with the hook members 29 to secure the liner 27 in place, which may avoid the liner 27 from collapsing into the opening of the first securing means 20 if/when a soiled top cover portion 40 (or the liner 47 thereof) is engaged with the first securing means 20. However, other fastening devices may be used to secure the liner 27 to the first securing means 20, such as an elastic band that may go around the liner 27 and secure the liner 27 to the outer surface or other portion of the first securing means 20, or an adhesive applied to the plastic liner prior to installation within the first securing means 20. Furthermore, embodiments of the first securing means 20 may be comprised of a plastic material, a composite material, a hard plastic, metal, rubber, and a combination thereof.

Figure 3A:
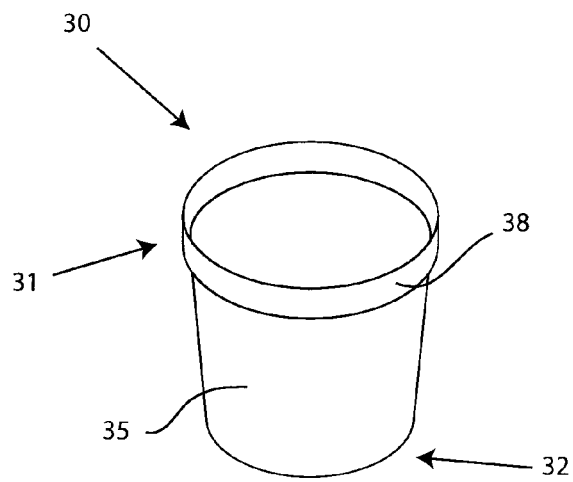
FIG. 3A depicts a perspective view of a first embodiment of a second securing means.
Figure 3B:
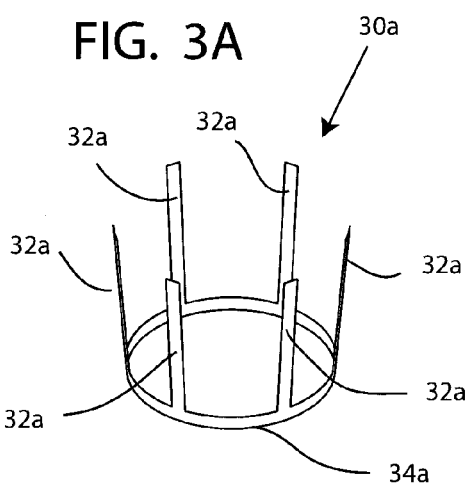
FIG. 3B depicts a perspective view of a second embodiment of the second securing means.

Referring again to FIG. 1, and additional reference to FIGS. 3A and 3B, embodiments of the wearable animal waste collection device 100 may include a second securing means 30, or second securing portion 30. Embodiments of the second securing means 30 may be configured to removably secure, support, hold, accommodate, carry, etc., a collection portion 55 of a direct collection device 50, the direct collection device 50 configured for collection of animal waste, described in greater detail infra. Embodiments of the second securing portion 30 may be attached, affixed, fastened, mounted, adhered, joined, etc. to the wearable structure 60. Embodiments of the second securing means 30 may be directly attached to the attachment portion 63 of the wearable structure 60. Alternatively, the second securing means 30 may be attached directly to the band portion 66. The first securing means 20 and the second securing means 30 may be approximately between 1" to 3" apart from one another on the attachment portion 63, or band portion 66. Embodiments of the second securing means 30 may be a structure configured to releasably hold the direct collection device 50. In one embodiment, shown in FIG. 3A, the second securing means 30 may be a cup-like device having a top end 31 and a bottom end 32, and a body 35 defining the second securing means 30 between the top end 31 and the bottom end 32. Thus, the direct collection device 50, in particular, the collection portion 55 of the direct collection device 50 may be placed within the body 35 through the top end 31, which may hold, support, releasably engage, etc., the direct collection device 50 until the direct collection device 50 is needed. Embodiments of the cup-like second securing means 30 may have a volume or space within the body 35 to receive the collection portion 55. Moreover, embodiments of the second securing means 30 shown in FIG. 3A may include a lip 38 that may mate with or engage a lip 58 of the collection portion 55.

FIG. 3B depicts an alternative embodiment of the second securing means 30a may include a plurality of resilient fingers 32a extending from an annular base 34a to accommodate a collection portion 55 of the direct collection device 50. For instance, the plurality of fingers 32a and the annular base 34a may define a basket for receiving the collection portion 55 of the direct collection device 50. The plurality of fingers 32a may resiliently engage the collection portion 55 to releasably secure the direct collection device 50 to the wearable structure 60. The second securing means 30, 30a may be available in different sizes, depending on the size of the wearable structure 60 or the size of the animal. In one embodiment, the second securing means 30 may have a largest diameter between 3" and 5", and a height between 2" and 5". Furthermore, embodiments of the second securing means 30, 30a may be comprised of a plastic material, a composite material, a hard plastic, metal, rubber, and a combination thereof.

Figure 4:
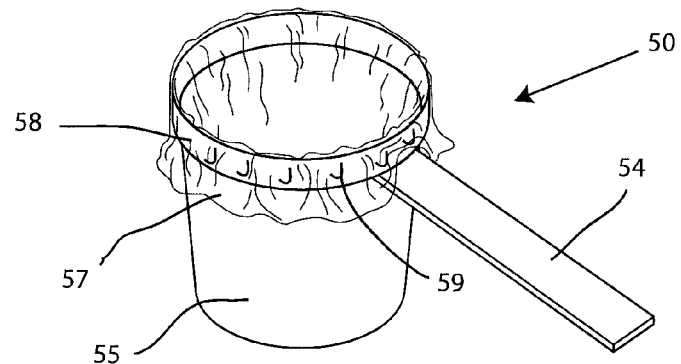
FIG. 4 depicts a perspective view of an embodiment of a direct collection device.

Referring now to FIG. 4, embodiments of the wearable animal waste collection device 100 may include a direct collection device 50. Embodiments of the direct collection device 50 may be configured to collect and temporarily store animal waste. Embodiments of the direct collection device 50 may include a collection portion 55 and a handle portion 54. Embodiments of the collection portion 55 may be configured to be in a resting and/or removable engagement with the second securing means 30, 30a. Embodiments of the collection portion 55 may be a storage container, such as a cup, having a volume. The collection portion 55 may include a bottom surface and a wall, wherein the top of the collection portion is open to receive animal waste. The collection portion 55 may have a circular or curvilinear cross-section, or may have a square or rectangular cross-section. Moreover, embodiments of the collection portion 55 may be lined with a disposable plastic liner 57 to protect or prevent contact between animal feces and the collection portion 55. The disposable liner 57 may fit within the collection portion 55, wherein a portion of the disposable liner 57 extends beyond and outside the collection portion 55. The portion of the disposable liner 57 extending outside the collection portion 55 may interact with a plurality of hook members 59 located along a lip 58 of the collection portion 55. For instance, the disposable liner 57 may be fastened to the lip 58 of the collection portion 55 by gripping the liner 57 and stretching or placing it into contact with the hook members 59 to secure the liner 57 in place, which may avoid the liner 57 from collapsing into the collection portion 55 when animal waste enters the collection portion 55. However, other fastening devices may be used to secure the liner 57 to the collection portion 55, such as an elastic band that may go around the liner 57 and secure the liner to the lip 58 or other portion of the collection portion 55, or an adhesive applied to the plastic liner prior to installation within the collection portion 55. The collection portion 55 may be rigid, for example, the structure of the collection portion 55 may be rigid or otherwise non-resilient when animal waste enters the opening of the collection portion 55 and fills the collection portion 55. A rigid-like body of the collection portion 55 may provide structural integrity and reduce flexing and/or bending of the direct collection device 50 when collecting animal waste. Furthermore, embodiments of the collection portion 55 may be comprised of a plastic material, a hard plastic, a composite material, metal, or a combination thereof.

Embodiments of the direct collection device 50 may include a handle portion 54 connected to the collection portion 55. Embodiments of the handle portion 54 may be structurally integral with the collection portion 55, or may be fastened to the collection portion 55 through fastening means known to those skilled in the art. The handle portion 54 may extend from the collection portion 55 a distance sufficient for a user 10 to grip, hold, etc., the rigid handle portion 54. In most embodiments the handle portion 54 permanently attached to the collection portion 54 can extend a distance sufficient to allow the user 10 to manipulate the direct collection device 50 into a position of collection of animal waste, without risking accidental contact between the animal feces and the hand(s) of the user 10. Further, the length of the handle portion 54 may also determine how close the user 10 has to get to the animal's rear end while the animal is having a bowel movement. Those having ordinary skill in the art should appreciate that the length of the handle portion 54 may vary depending on various size and other design considerations. In addition, the handle portion 54 may be telescopic or otherwise adjustable so the user 10 can increase the length of the handle portion 54 when it is time to collect the animal waste and reduce the length when returning the direct collection device 50 to the second securing means 30, 30a. Embodiments of the handle portion 54 may be comprised of plastic, hard plastic, composite, metal, wood, and combinations thereof.

Figure 5A:
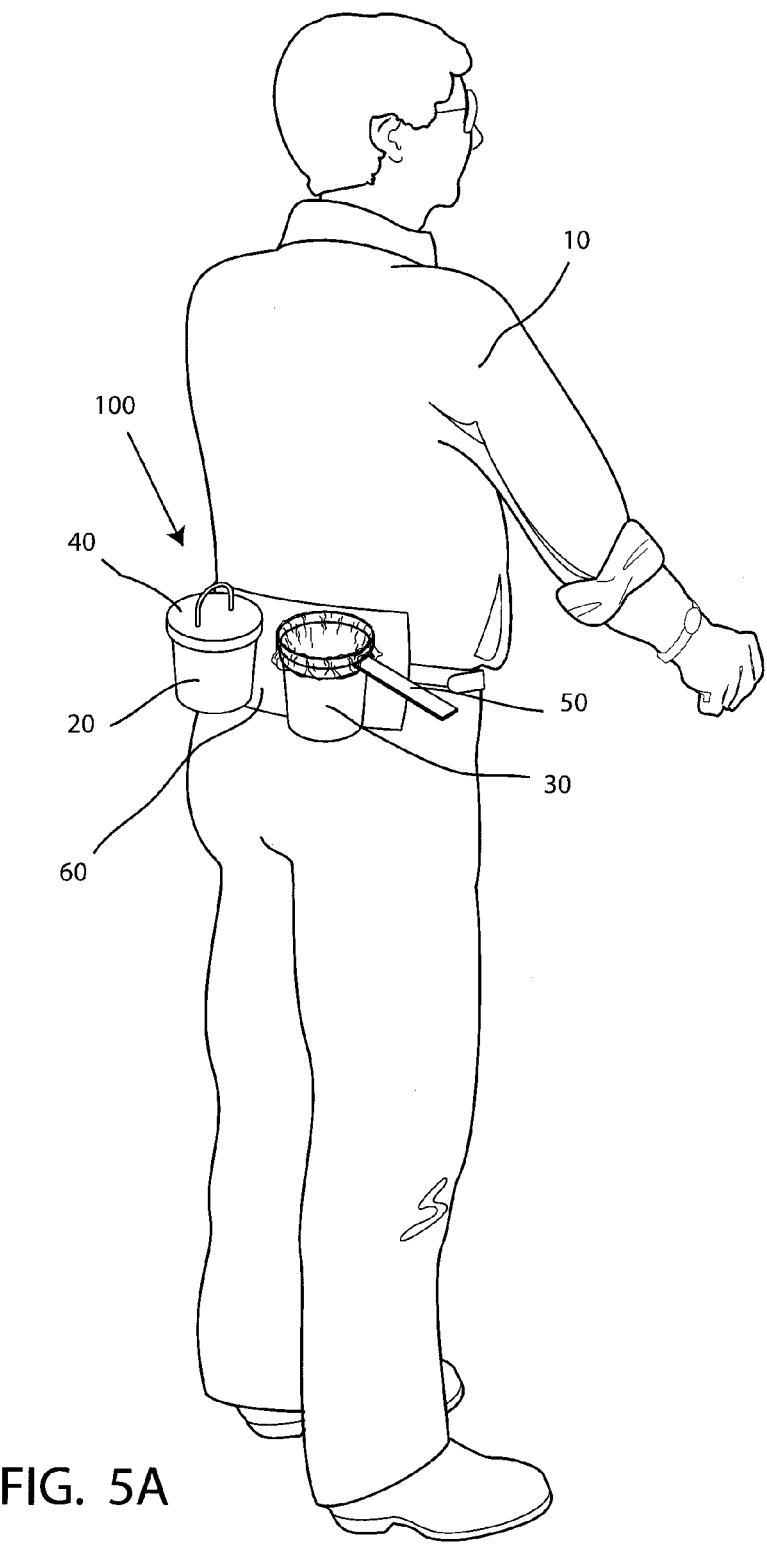
FIG. 5A depicts a perspective view of an embodiment of the wearable animal waste collection device worn by a user, wherein the direct collection device is in a secured, uncovered position.
Figure 5B:
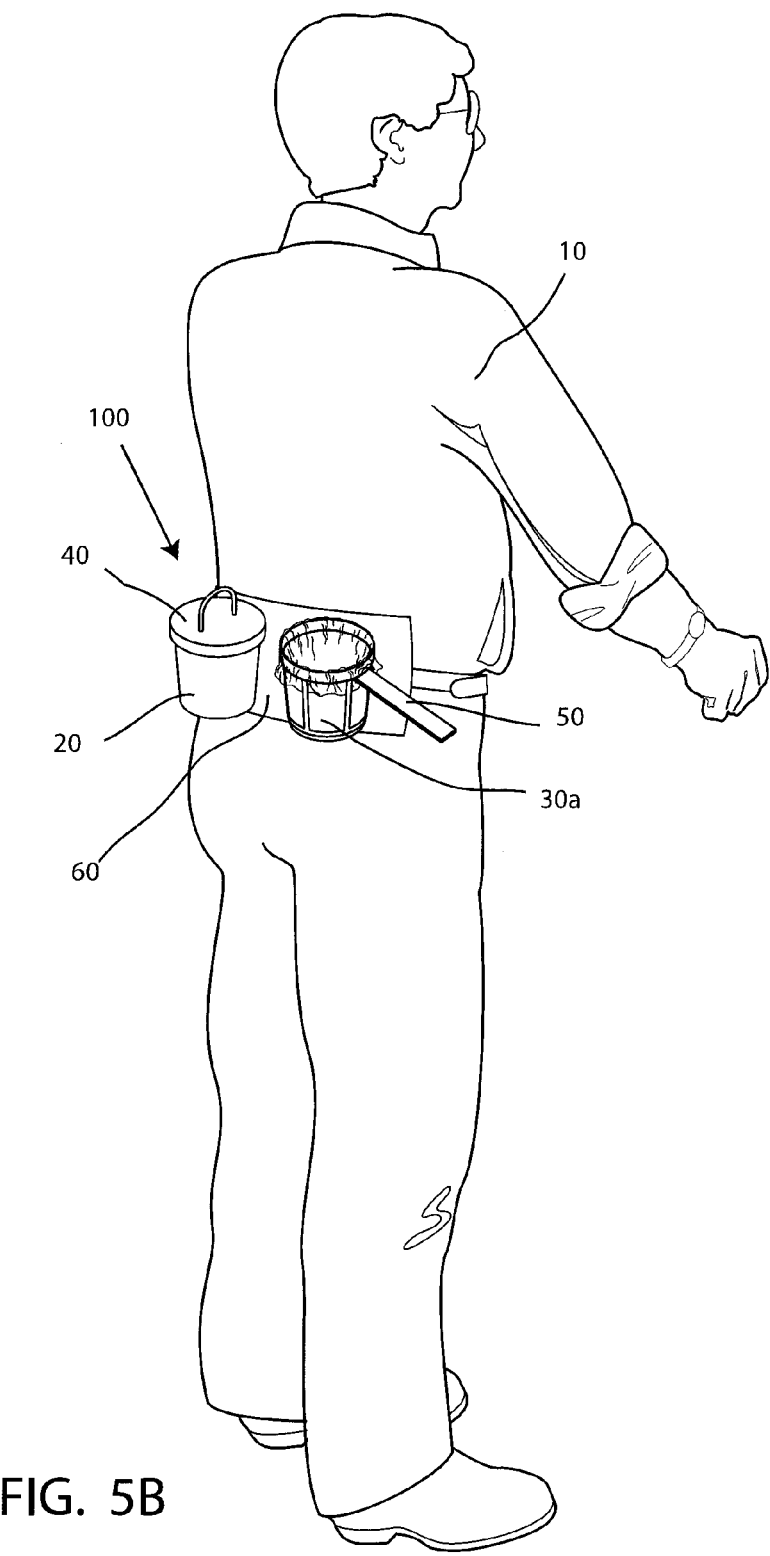
FIG. 5B depicts a perspective view of an embodiment of the wearable animal waste collection device worn by a user, wherein the direct collection device is in a secured, uncovered position.
Figure 6:
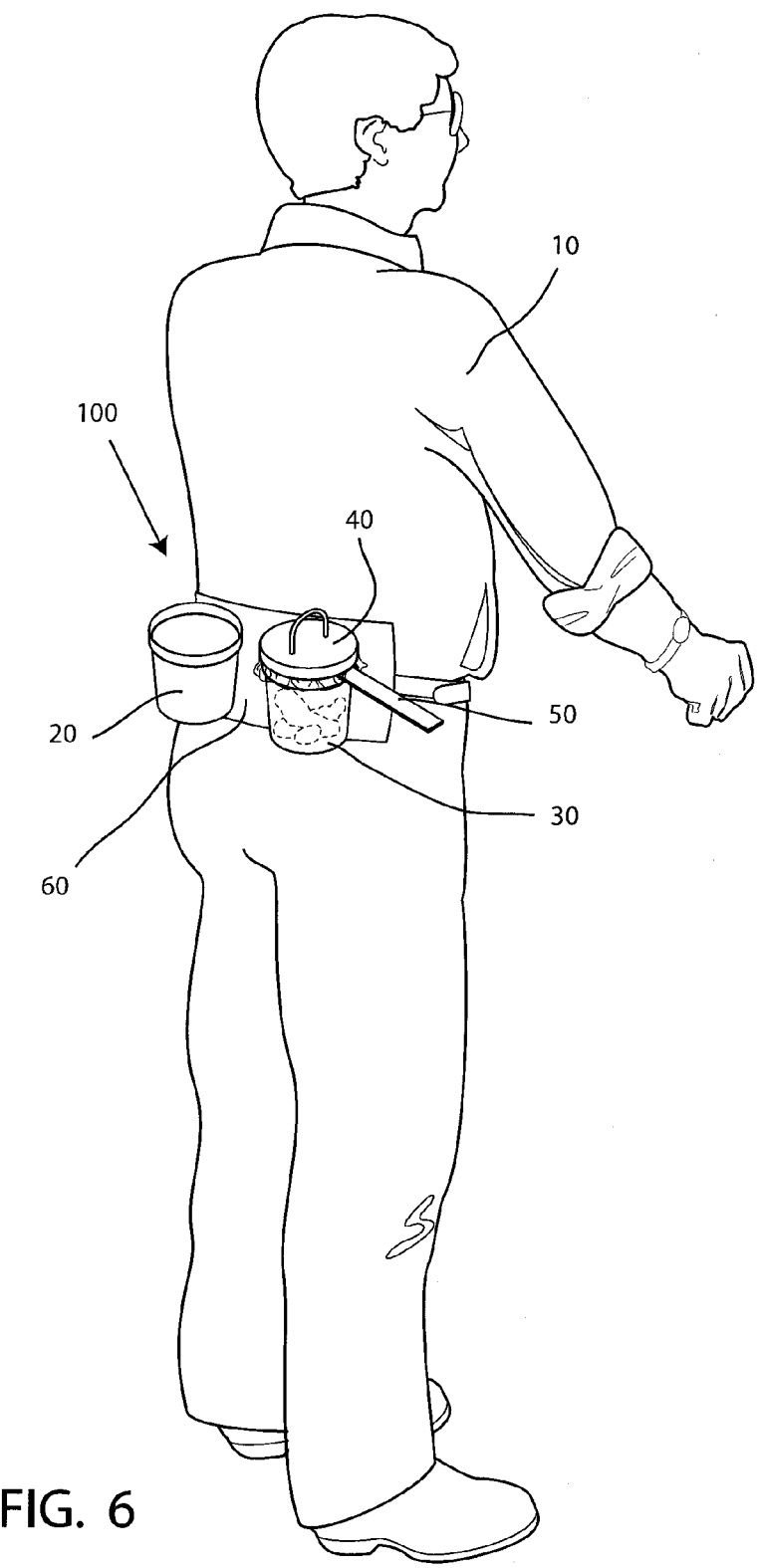
FIG. 6 depicts a perspective view of an embodiment of the wearable animal waste collection device worn by a user, wherein the direct collection device is in a secured, covered position, temporarily storing animal waste.
Figure 7:
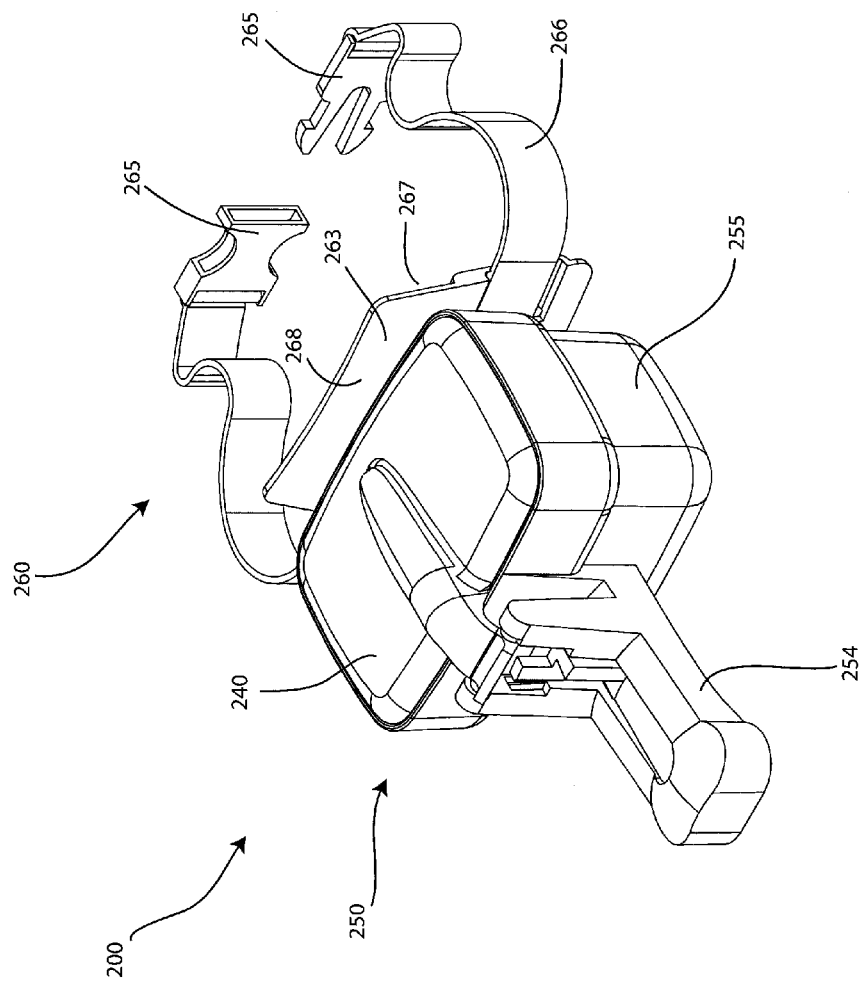
FIG. 7 depicts a first perspective view of a second embodiment of a wearable animal waste collection device.
Figure 8:
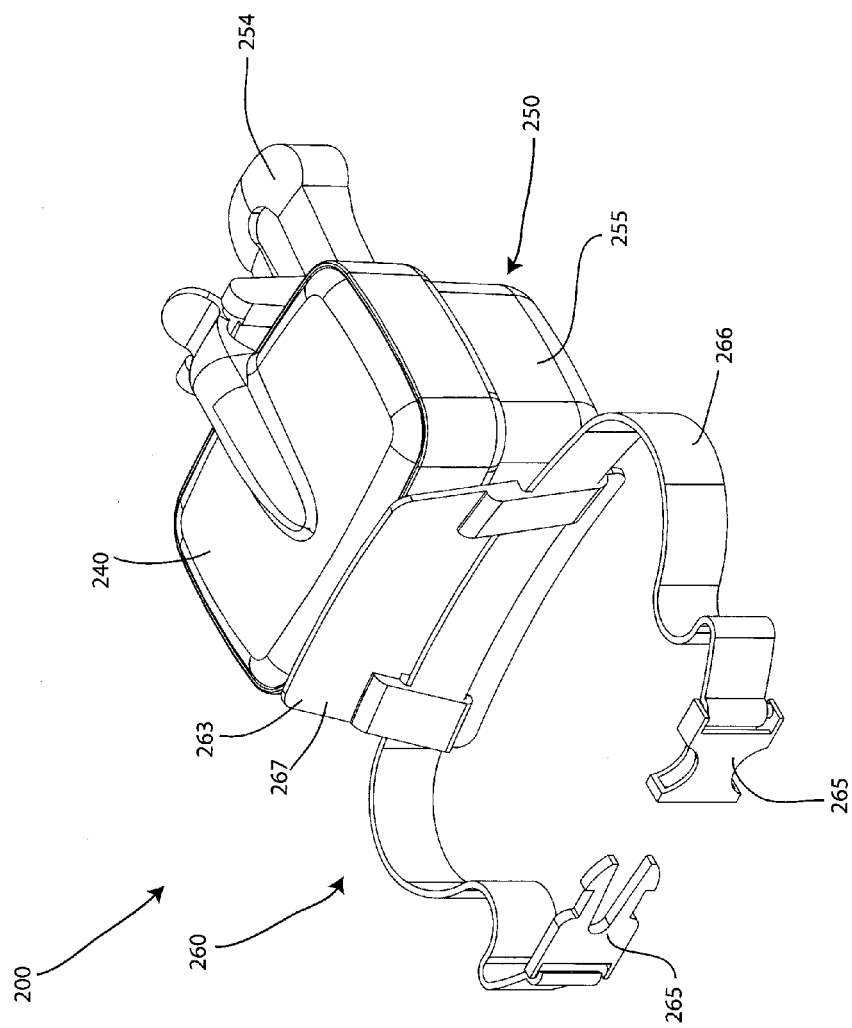
FIG. 8 depicts a second perspective view of the second embodiment of a wearable animal waste collection device.
Figure 9:
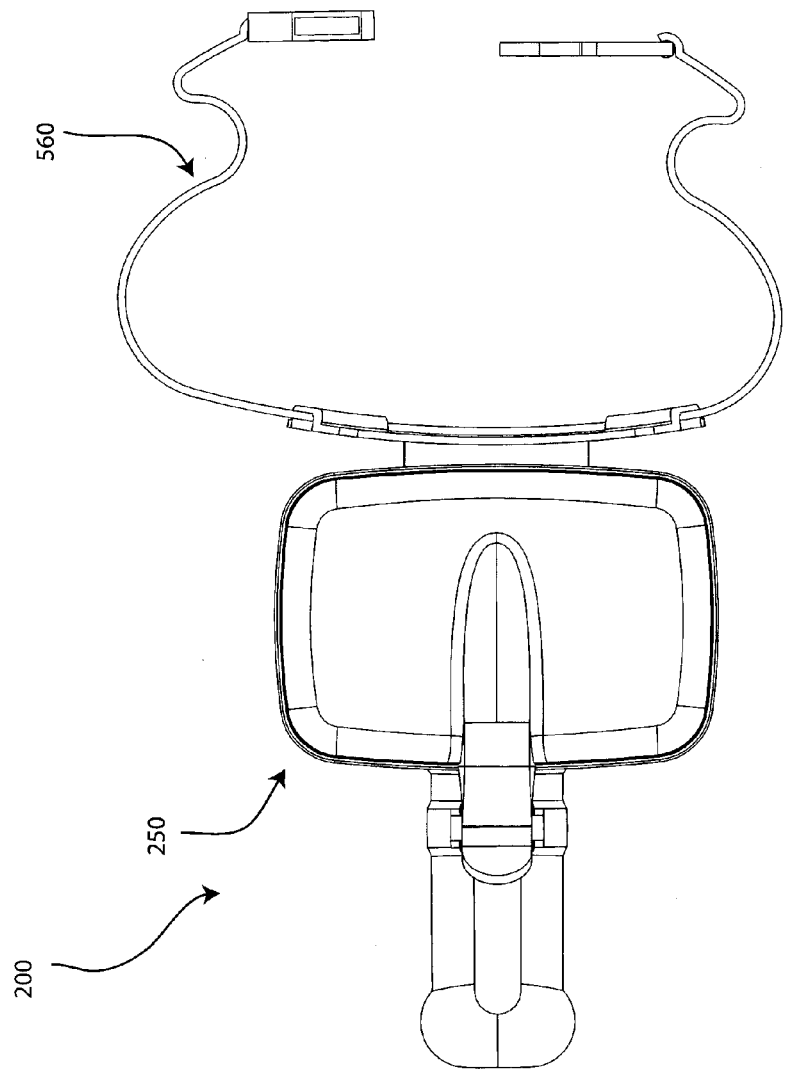
FIG. 9 depicts a top view of the second embodiment of a wearable animal waste collection device.
Figure 10:
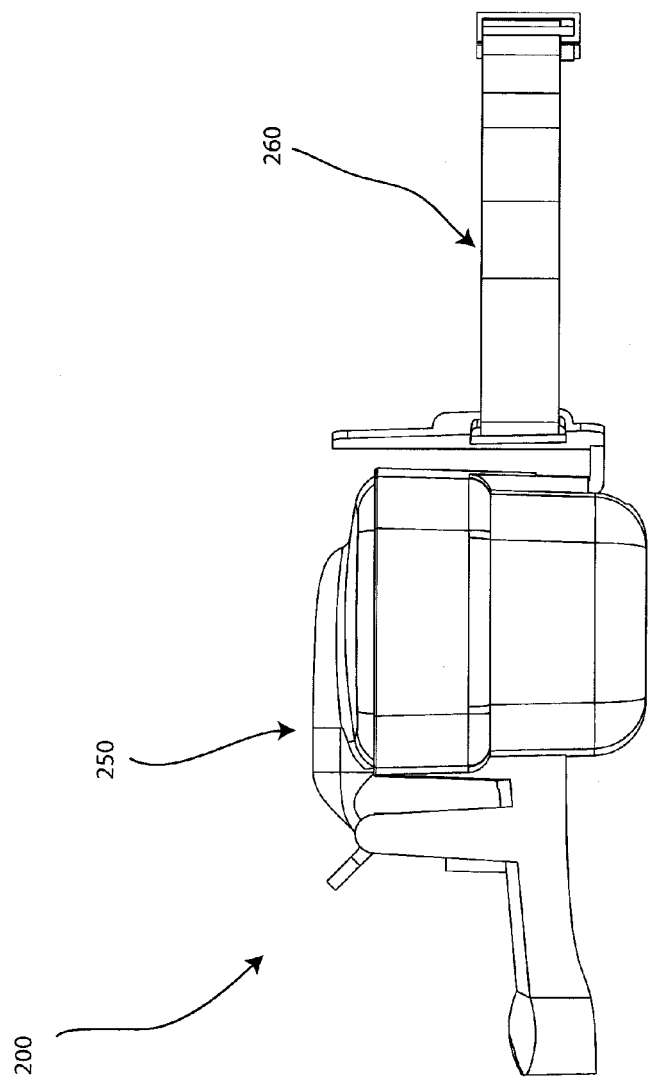
FIG. 10 depicts a side view of the second embodiment of a wearable animal waste collection device.

Referring now to FIGS. 5A-6, the manner in which the wearable animal waste collection device 100 may be used will now be described. FIGS. 5A and 5B depict an embodiment of the wearable animal waste collection device 100 in a first position, wherein, when in the first position, the wearable animal waste collection device 100 is worn by the user 10, and no waste has been collected. For instance, the wearable structure 60 is being worn around the waist of the user 10, the first securing means 20 is accommodating the top cover portion 40, and the second securing means 30, 30a is accommodating the direct collection device 50. The first position of the wearable animal waste collection device 100 may be a time before the animal has a bowel movement; the user 10 may have both hands free, or may have at least one hand free if one hand is holding a leash. When the animal is about have a bowel movement and defecate onto the ground, the user 10 may reach for the handle portion 54 and grab the direct collection device 50. Once the user 10 grabs the direct collection device 50, the user 10 may position the collection portion 55 of the direct collection device 50 proximate or otherwise near or underneath the hindquarters of the animal to catch, collect, capture, etc., the animal feces before they contact a ground surface, such as a street, lawn, sidewalk, or grass or concrete surface. The rigid body of the collection portion 55 can help the user 10 catch the feces because it will not deform or crumple when the animal waste contacts the collection portion 55; the lack of deformation of the collection portion 55 when the waste is collected allows for reuse of the direct collection device 50, and sturdy/firm/secure engagement with the second securing means 30, 30a. Because the animal waste is collected by the direct collection device 50 before the waste lands on the ground, the user 10 does not have to bend down and pick up the waste with their hands (likely covered by an inside-out plastic bag).

As shown in FIG. 6, after the animal waste has been collected or captured in the collection portion 55, the user 10 may return the collection portion 55 to the second securing means 30, 30a located on the wearable structure 60 around their waist. To eliminate and/or reduce the odor of the animal waste and prevent spillage of the waste, the user 10 may detach or remove the top cover portion 40 from the first securing means 20 and place the top portion 40 over the collection portion 55 to cover the animal waste within the collection portion 55. This may be referred to as a second position, wherein the wearable animal waste collection device 100 is worn by the user, the direct collection device 50 is temporarily storing animal waste and is secured by the second securing means 30, 30a, and the top cover portion 40 may be engaged with the collection portion 55 of the direct collection device 50. Embodiments of the top cover portion 40 may include a gripping means 45, such as a loop or hook, for the user 10 to conveniently grab, remove, and place the top cover portion 40 onto the collection portion 55 and back onto the first securing means 20 in the event the direct collection device 50 is needed more than once before the waste is disposed. Moreover, embodiments of the top cover portion 40 may be lined with a disposable plastic liner 47 to protect the top portion 40 from contact with the animal waste. The top cover portion 40 may include a plurality of hook members 49, or other liner gripping means, to allow the disposable liner 47 to be secured into place, similar to the hook members 59 located along the lip 58 of the collection portion 55, or the liner 47 may include a pre-applied adhesive, such as an adhesive tab, for adhering to the edge of the top cover portion 40. To further prevent odors from escaping the collection portion 55 and/or preventing or hindering the top cover portion 40 from unwanted disengagement from the collection portion 55, the top cover portion 40 and the collection portion 55 may have opposingly tapered surfaces. Other mechanical means may be employed to obtain a snug engagement/press-fit engagement between the top cover portion 40 and the collection portion 55 may be used, such as a tongue and groove, hook and loop, ball and detent, and various lips and corresponding detents. Furthermore, the animal waste may be stored within the collection portion 55 of the direct collection device 50 which is in resting and/or removable engagement with the second securing means 30, 30a until the user 10 has a chance to dispose of the waste. It should be noted that while the user 10 is wearing the wearable animal waste collection device 100 and after (or before) the animal waste is stored within the collection portion 10 and the direct collection 50 is re-engaged with the second securing means 20, the user 10 does not have to carry a bag or other container of waste, which allows the user 10 to have at least one hand free while outdoors with the animal. To dispose of the animal waste, the user 10 may simply detach the plastic liner 57 which holds the waste from the collection portion 55 and dispose of the plastic liner 57 containing the waste. The user 10 may also detach the plastic liner 47 from the top cover portion 40. The liners 47, 57 may be replaced for the next use of the wearable animal waste collection device 100.

Referring to FIGS. 1-6, a method of animal waste collection comprising providing a wearable animal waste collection device 100 comprising a wearable structure 60 configured to be worn around a waist of a user 10, a top cover portion 40 secured by a first securing means 20 attached to the wearable structure 60, and a direct collection device 50 having a rigid collection portion 55 and a rigid handle portion 54, the direct collection device 50 being secured by a second securing means 30 attached to the wearable structure 60, wherein an animal waste is collected with the direct collection device 50 before the animal waste reaches a ground surface, wherein the animal waste is temporarily stored in the rigid collection portion 55 of the direct collection device 50.

With continued reference to the drawings, FIGS. 7-10 depict an embodiment of a wearable animal waste collection device 200. Embodiments of the wearable animal waste collection device 200 may share the same or some of the structural and/or functional aspects of the wearable animal waste collection device 100 described above. For instance, embodiments of the wearable animal waste collection device 200 may be a portable dog toilet for convenient and sanitary collection of animal waste. Embodiments of the wearable animal waste collection device 200 may be worn by a user 10. User 10 may be a human being, a pet owner, a dog-walker, an adult, a child, or any person having a torso to accommodate, wear, support, carry, etc., the wearable animal waste collection device 200. However, the wearable animal waste collection device 200 may be attached to an inanimate object, such as a baby stroller, bike, or any structure capable of accommodating, wearing, carrying, supporting, etc., the wearable animal waste collection device 200. Moreover, embodiments of the wearable animal waste collection device 200 may be worn by a user 10 while outdoors in a presence of an animal, wherein the animal could have a bowel movement. Embodiments of an animal may include a pet, such as a dog, cat, pig, fox, and the like, or any domesticated or trained animal where a user 10 is responsible for cleaning up after the animal. In most embodiments, the wearable animal waste collection device 200 worn by the user 10 is to responsibly, conveniently, and sanitarily collect, temporarily store, and dispose of dog feces. Accordingly, the wearable animal waste collection device 200 may be worn by the user 10 while out walking an animal, such as a dog, and not have to worry about a collection means for animal waste on other's property.

Referring to FIGS. 7-10, embodiments of the wearable animal waste collection device 200 may include a wearable structure 260 and a direct collection means 250. Embodiments of the wearable animal waste collection device 200 may operate in the same manner as described above with respect to wearable animal waste collection device 100.

Embodiments of the wearable animal waste collection device 200 may include a wearable structure 260. Embodiments of the wearable structure 260 may share the same or some of the same structural and/or functional aspects of the wearable structure 60 described above. For instance, embodiments of the wearable structure 260 may be a structure or article that can be worn by a user 10, or releasably fastened to an object. Embodiments of the wearable structure 260 may be adjustable to accommodate users of different sizes. Embodiments of the wearable structure 260 may include a band portion 266 having a fastening means 265 attached to at least one end of the band portion 266. Embodiments of the band portion 266 may be configured to extend around a user's torso proximate the hips of the user 10 when being worn by the user 10. Embodiments of the band portion 266 may be a band, a strap, a belt, a flexible band, a flexible strap, a web band, a woven cloth band, nylon band, or a section of material configured to be wrapped around a torso of a user 10. The band portion 266 may have various lengths, widths, and thicknesses, and may be comprised of various materials. For instance, embodiments of the band portion 266 may be made of a heavy cloth, leather, vinyl, plastic, nylon, string(s), or a combination thereof, may be approximately 1" wide. One end of the band portion 266 may include a fastening means 265, wherein the fastening means 265 cooperates with the other end of the band portion 266, or another fastening member 265, to releasable secure or fasten the wearable structure 260 to the user 10 or an object. In an exemplary embodiment, the ends of the band portion 265 join together and are releasably fastened by the fastening members 265 in front of the user's abdomen. Embodiments of the fastening means 265 may be a conventional belt buckle, a heel roller buckle, a loop and hook buckle, a clamp buckle, a box frame buckle, a clip, a two ring fastener, and the like.

Furthermore, embodiments of the wearable structure 260 may include an attachment portion 263. Embodiments of the attachment portion 263 may be a structure or section of material that can both spaciously accommodate and physically support the mounting of additional components of the wearable animal waste collection device 200 to the wearable structure 260. Embodiments of the attachment portion 263 may be attached, fastened, adhered, affixed, joined, and the like, to the band portion 266. Alternatively, the attachment portion 263 may be integral to the band portion 266. The attachment portion 263 may be comprised of the same material as the band portion 266, or may be comprised of a different material than the band portion 266. For instance, the attachment portion 263 may be a plastic sheet-like structure affixed to a leather, nylon, cotton, or woven cloth band portion 266. Further embodiments of the attachment portion 263 may include a combination of a conformal material, such as a plastic or rubber to conform to the user's back or hips, and a harder plastic for the mounting of the direct collection means 250. Embodiments of the attachment portion 263 may be located proximate or otherwise near a center location between the ends of the band portion 266; however, the attachment portion 263 may be located at any point along the band portion 266. The location of the attachment portion 263 can be adjustable, slidably or otherwise, for repositioning of the attachment portion 263 to adjust to different shapes and sizes of the user, provide easier access to the direct collection device 250, and overall comfortability of the user 10. Embodiments of the attachment portion 263 may have an increased width and thickness of the band portion 266, and the thickness and width may vary depending on the weight of the additional components of the wearable animal waste collection device 200, including the direct collection device 250. In one embodiment, a width measured horizontally across the attachment portion 263 may be between 13" and 17". In another embodiment, a width measured horizontally across the attachment portion 263 may be 15.5". In still further embodiments, a width measured horizontally across the attachment portion 263 may be between 5" and 8"; for example, the width may be 6.45". Further, an embodiment of a length measured vertically across the attachment portion 263 may be between 3.5" and 7". In another embodiment, a length measured vertically across the attachment portion 263 may be 6.25". Those skilled in the art should appreciate that the dimensions of the attachment portion 263 may vary to accommodate various design specifications and practical requirements, such as the size of the user 10 or a size of the animal. Embodiments of the attachment portion 263 of the wearable structure 260 may include a first surface 267 and a second surface 268, wherein the first surface 267 may be configured to rest against a back or portion of the user 10.

Figure 11:
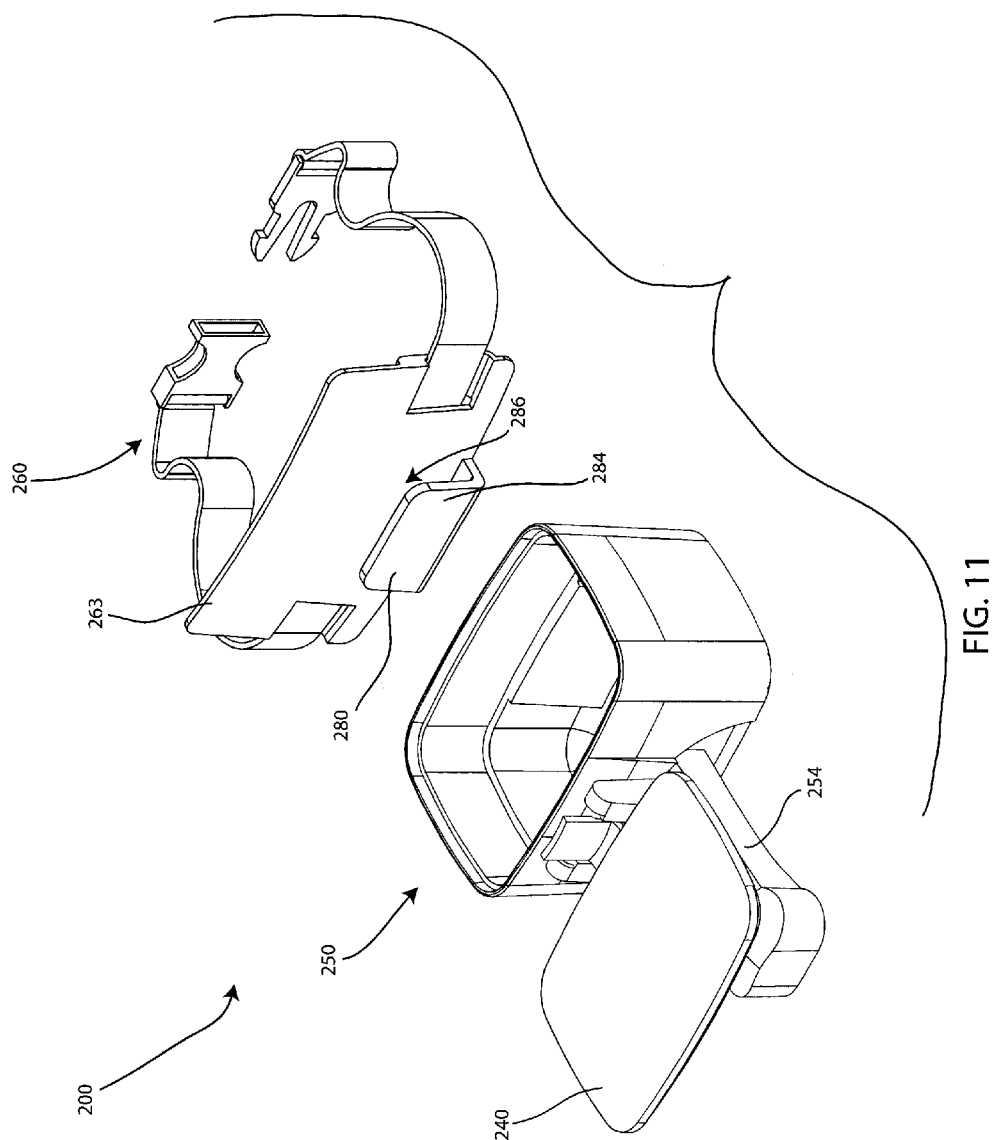
FIG. 11 depicts a first assembly view of the second embodiment of a wearable animal waste collection device.
Figure 12:
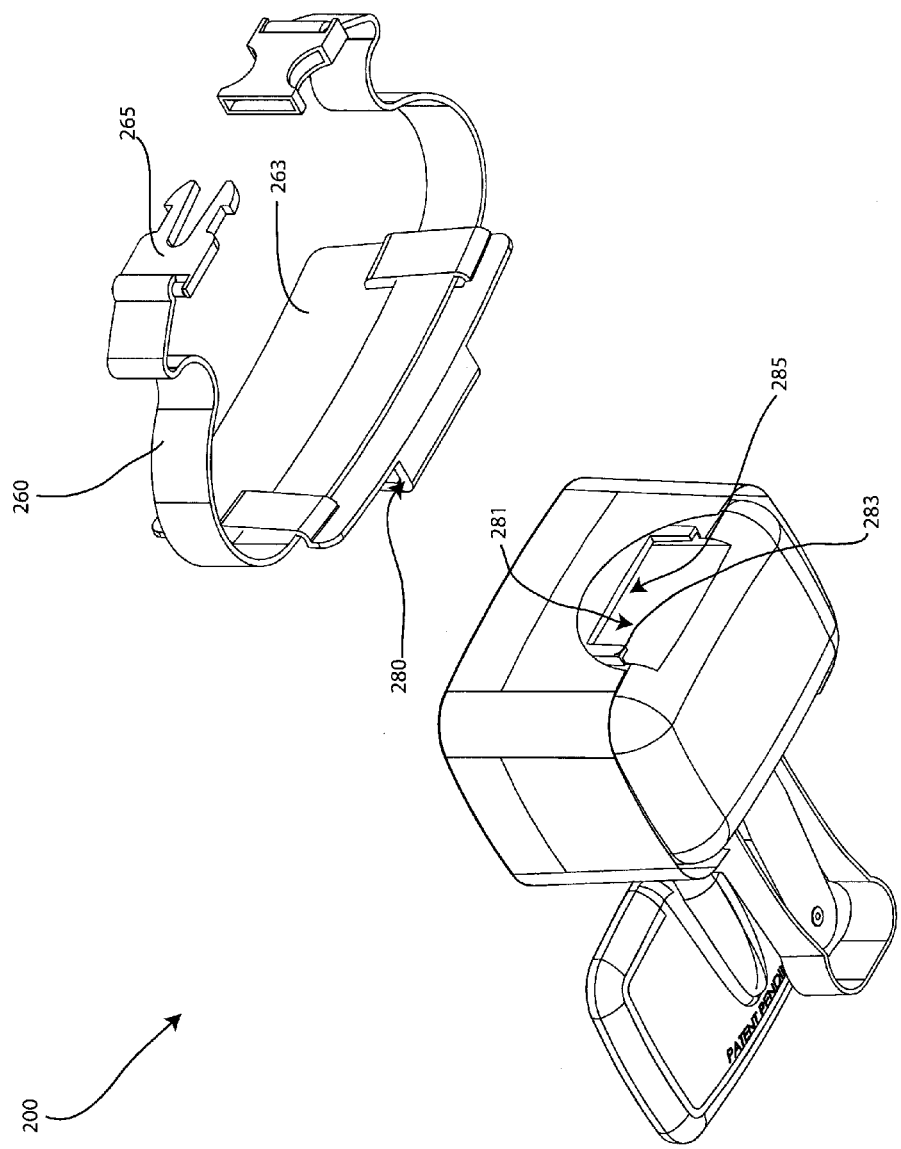
FIG. 12 depicts a second assembly view of the second embodiment of a wearable animal waste collection device.

Moreover, embodiments of the attachment portion 263 may include a connection portion 280 for connecting the wearable structure 260 to the direct collection means 250, as shown in FIGS. 11 and 12. Embodiments of the connection portion 280 may cooperate with a receiving portion 285 of the direct collection means 250. Embodiments of the connection portion 280 may include an engagement structure 284 configured to be received by the receiving portion 285 of the direct collection means 250. The engagement structure 284 may extend a distance or protrude from the second surface 268 of the attachment portion 263 of the wearable structure 260. In other words, there may be a gap 286 between the engagement structure 284 and the attachment portion 263 when the wearable structure 260 and the direct collection means 250 are in a first, connected position. The gap 286 may accommodate, receive, accept, etc., retaining structure 283 of the direct collection means 250 and other portions of the direct collection means 250 that extend beyond the receiving portion 285 towards the wearable structure 260 when in the connected position. To achieve the first, connected position, a user may locate the direct collection means 250 proximate the wearable structure 260 and align the engagement structure 284 with the gap 281 of the receiving portion 285, and place the engagement structure 284 in structural cooperation with the retaining structure 283. For example, in the first, connected position, the engagement structure 284 may be disposed within the gap 281 and within, partially within, and/or underneath the retaining structure 283 of the direct collection means 250.

Referring now to FIGS. 7-12, embodiments of the wearable animal waste collection device 200 may include a direct collection means 250. Embodiments of the direct collection means 250 may share the same or some of the same structural and/or functional aspects of the direct collection means 50 described above in association with the wearable animal waste collection device 100. Embodiments of the direct collection means 250 may be a device configured to collect and temporarily store animal waste. Embodiments of the direct collection device 250 may include a collection portion 255 and a handle portion 254. Embodiments of the collection portion 255 may be configured to be in a resting and/or removable engagement with the wearable structure 260 (e.g. via the cooperation between the receiving portion 285 and the connection portion 280). Embodiments of the collection portion 255 may be a storage container, such as a cup, box, bowl, having a volume. The collection portion 255 may include a bottom surface and a wall, wherein a top of the collection portion 255 may be opened to receive animal waste. The collection portion 255 may have a circular or curvilinear cross-section, or may have a square or rectangular cross-section. Moreover, embodiments of the collection portion 255 may be lined with a disposable plastic liner to protect or prevent contact between animal feces and the collection portion 255. The disposable liner may fit within the collection portion 255, wherein a portion of the disposable liner may extend beyond and outside the collection portion 255. The portion of the disposable liner extending outside the collection portion 255 may interact with a plurality of hook members located along a lip of the collection portion 255. For instance, the disposable liner may be fastened to the lip of the collection portion 255 by gripping the liner and stretching or placing it into contact with the hook members to secure the liner in place, which may avoid the liner from collapsing into the collection portion 255 when animal waste enters the collection portion 255. However, other fastening devices may be used to secure the liner to the collection portion 255, such as an elastic band that may go around the liner and secure the liner to the lip or other portion of the collection portion 255, or an adhesive applied to the plastic liner prior to installation within the collection portion 255. The collection portion 255 may be rigid, for example, the structure of the collection portion 255 may be rigid or otherwise non-resilient when animal waste enters the opening of the collection portion 255 and fills the collection portion 255. A rigid-like body of the collection portion 255 may provide structural integrity and reduce flexing and/or bending of the direct collection device 250 when collecting animal waste. Furthermore, embodiments of the collection portion 255 may be comprised of a plastic material, a hard plastic, a composite material, metal, or a combination thereof.

Furthermore, with additional reference to FIGS. 13A-15, embodiments of the direct collection means 250 may include a cover portion 240. Embodiments of the top cover portion 240 may be sized and dimensioned to correspond to the collection portion 255. For instance, the top cover portion 240 may be sized to entirely cover the interior of the collection portion 255. Embodiments of the top cover portion 240 may be hingedly connected to the collection portion 255. Alternatively, embodiments of the top cover portion 240 may simply be sized for an interference fit and can be taken on and off by the user when the access to the interior portion of the collection portion 255 is needed. Accordingly, embodiments of the cover portion 240 may open and close the direct collection device 250, in particular, the collection portion 255. To facilitate the cover portion 240 moving from a closed position, as shown in FIG. 13A, to an open position, as shown in FIG. 13B, embodiments of the top cover 240 may include a thumb latch 247. Embodiments of the thumb latch 247 may be a latch, a lip, a tongue, a protrusion, or other unique structural feature that provides a contact surface for providing rotation of the top cover portion 240 about an axis 258. Embodiments of the thumb latch 247 may be structurally integral with the cover portion 240 or may separately be attached to the cover portion 240. In an exemplary embodiment, a user 10 may depress the thumb latch 247 with a thumb, finger, or the like, which can cause the cover portion 240 to lift backwards towards the handle portion through rotation about axis 258 and expose the interior of the collection portion 240. The axis 258 may be a hinge or other mechanical component that allows the cover 240 to be hingedly connected to the collection portion 255 and expose the interior of the collection portion 255.

Figure 14:
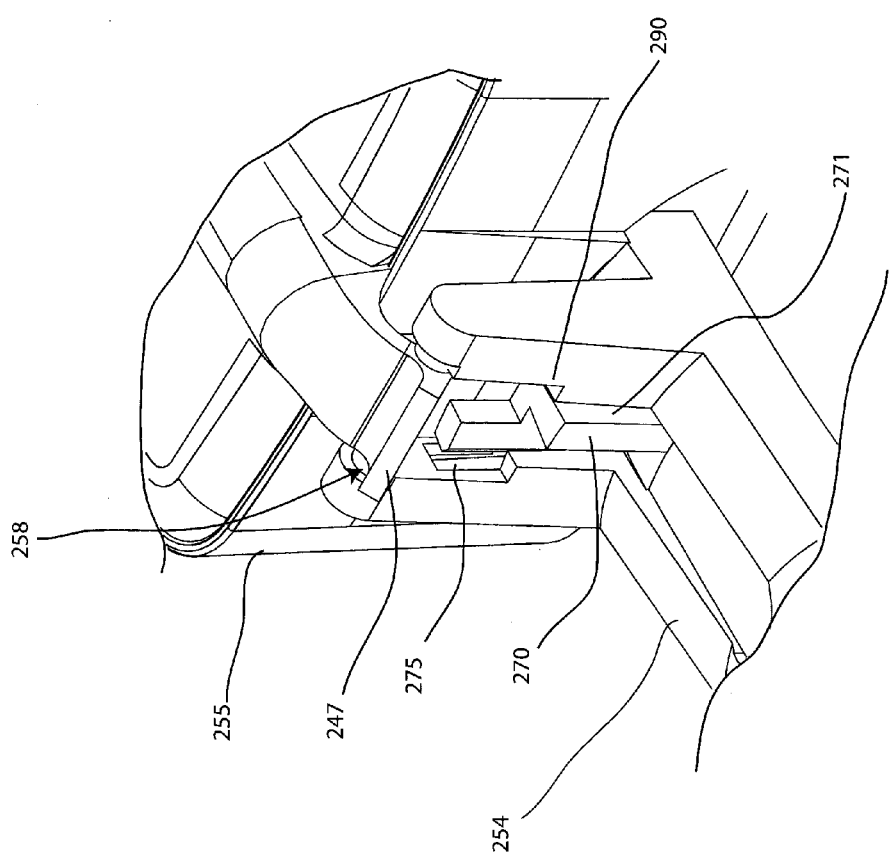
FIG. 14 depicts a scaled up perspective view of an embodiment of a locking means in a locking position.
Figure 15:
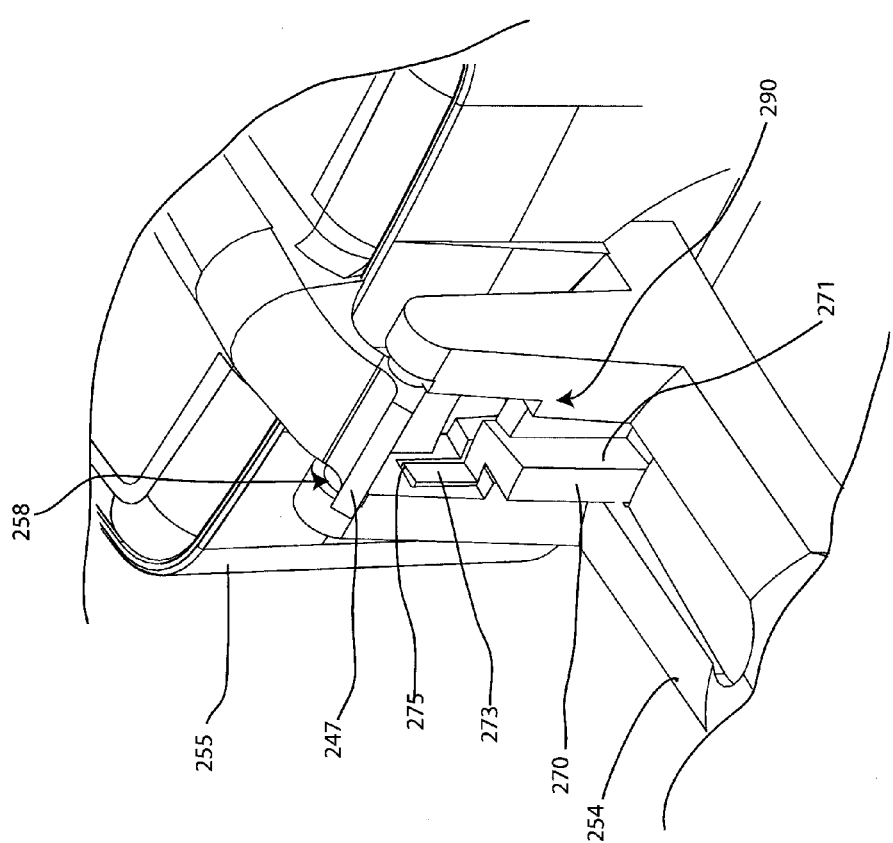
FIG. 15 depicts a scaled up perspective view of an embodiment of the locking means in an unlocking position.

Moreover, embodiments of the wearable animal waste collection device 200 may include a locking means 290 to lock, secure, stabilize, or otherwise hinder free movement of the top cover portion 240 from a closed position to an open position. For instance, if the wearable animal waste collection device 200 is worn by the user in the connected position, wherein the cover portion 240 is in a closed position, the cover portion 240 may have a tendency to flop up and down while the user is moving. If the cover portion 240 opens up too much, there is a potential that solids within the interior as well as unwanted odors from the collected waste may escape the collection portion 255. Accordingly, embodiments of the wearable animal waste collection device 200 may include a locking system 290 to reduce movement of the cover 240 and or unwanted exposure of the interior of the collection portion 255. Embodiments of the locking means 290 may be a part of the handle portion 254, or may be a separate component, part, portion, etc., of the direct collection device 250. Embodiments of the locking means 290 may include an actuator 270 configured to be moved from a locking position, as shown in FIG. 14, to an unlocking position, as shown in FIG. 15. While in the locking position, the actuator 270 may be disposed beneath the thumb latch 247. Because the actuator 270 may be located directly below the thumb latch 247, downward movement of the thumb latch 247 may be prevented, hindered, stopped, reduced, controlled, and the like. In other words, a mechanical interference between the actuator 270 and the thumb latch 247 may resist an opening (or further opening) of the top cover portion 240. To move from the locking position to the unlocking position, the actuator 270 may be displaced, slid, moved, rotated, pushed, and the like, to enter opening 275. The openings 275 may be an opening, a groove, a chamber, a receptacle, or any void that can receive, accommodate, etc. all or a portion of the actuator 270. By entering the opening 275, the actuator 270 may no longer rest underneath the thumb latch 247 to allow full rotation of the top cover portion 240 about axis 258 when the thumb latch 247 is depressed and exposes the interior of the collection portion 255. Embodiments of the actuator 270 may be rotated from the locking to the unlocking position, or may be slid from side-to-side from the locking to the unlocking position. Embodiments of the actuator 270 may have a surface 271 that provides a contact surface for convenient actuation of the actuator 270. Further, opening 275 may be located to either side of the actuator 270.

Referring still to the drawings, embodiments of the direct collection device 250 may include a handle portion 254 connected to the collection portion 255. Embodiments of the handle portion 254 may be structurally integral with the collection portion 255, or may be fastened to the collection portion 255 through fastening means known to those skilled in the art. The handle portion 254 may extend from the collection portion 255 a distance sufficient for a user 10 to grip, hold, etc., the rigid handle portion 254. In most embodiments the handle portion 254 permanently attached to the collection portion 254 can extend a distance sufficient to allow the user 10 to manipulate the direct collection device 250 into a position of collection of animal waste, without risking accidental contact between the animal feces and the hand(s) of the user 10. Further, the length of the handle portion 254 may also determine how close the user 10 has to get to the animal's rear end while the animal is having a bowel movement. Those having ordinary skill in the art should appreciate that the length of the handle portion 254 may vary depending on various size and other design considerations. In addition, the handle portion 254 may be telescopic or otherwise adjustable so the user 10 can increase the length of the handle portion 254 when it is time to collect the animal waste and reduce the length when returning the direct collection device 250 to a connected position with the wearable structure 260. The handle portion 254 may also move up, down or sideways so that it does not protrude from the direct collection device 250 when the direct collection device 250 is in a connected position with the wearable structure 260. Embodiments of the handle portion 254 may be comprised of plastic, hard plastic, composite, metal, wood, and combinations thereof.

Referring now to FIGS. 7-15, the manner in which the wearable animal waste collection device 200 may be used will now be described. FIGS. 7-10 depict an embodiment of the wearable animal waste collection device 200 in a first, connected position, wherein, when in the first position, the wearable animal waste collection device 200 can be worn by the user 10. For instance, the wearable structure 260 may be worn around the waist of the user 10, while the direct collection means 250 is operably attached to the wearable structure 260. In this first position, the user 10 may have both hands free, or may have at least one hand free if one hand is holding a leash. When the animal is about have a bowel movement and defecate onto the ground, the user 10 may reach for the handle portion 254 to control the direct collection device 250 and detach it from the attachment portion 263 of the wearable structure 260. User 10 may also move the direct collection device 250 from his back to his side by pulling on the band portion 266, the attachment portion 263, or the collection portion 255 to more easily grasp the handle portion 254. Once the user 10 controls the direct collection device 250 that is detached from the wearable structure 260, the user 10 may position the collection portion 255 of the direct collection device 250 proximate or otherwise near or underneath the hindquarters of the animal to catch, collect, capture, etc., the animal feces before they contact a ground surface, such as a street, lawn, sidewalk, or grass or concrete surface. The user 10 may only need to use one hand to move the direct collection device 250 from the user's back to the user's side and from the side to the back, depress the thumb latch 247, detach the direct collection device 250 from or attach it to the wearable structure 260, collect waste with the direct collection device 250, close the top portion 240, and move the actuator 270 to lock or unlock the locking means 290. Therefore, user 10 may hold the leash with his other hand at all times. The rigid body of the collection portion 255 can help the user 10 catch the feces because it will not deform or crumple when the animal waste contacts the collection portion 255; the lack of deformation of the collection portion 255 when the waste is collected allows for reuse of the direct collection device 250, and sturdy/firm/secure engagement with the attachment portion 263. Because the animal waste is collected by the direct collection device 250 before the waste lands on the ground, the user 10 does not have to bend down and pick up the waste with their hands (likely covered by an inside-out plastic bag).

After the animal waste has been collected or captured in the collection portion 255, the user 10 may return the direct collection means 250 to a connected position with the wearable structure 260 around their waist. To eliminate and/or reduce the odor of the animal waste and prevent spillage of the waste, the user 10 may close the top cover portion 240 and/or lock the top cover portion 240 by moving the actuator 270 into a locking position under the thumb latch 247 of the top cover 240. Furthermore, the animal waste may be stored within the collection portion 255 of the direct collection device 250 which is in resting and/or removable engagement with the attachment portion 263 until the user 10 has a chance to dispose of the waste. The collection portion 255 is large enough to hold the contents of several bowel movements; therefore, the plastic liner does not need to be changed as user 10 walks the animal. It should be noted that while the user 10 is wearing the wearable animal waste collection device 200 and after (or before) the animal waste is stored within the collection portion 255 and the direct collection device 250 is re-engaged with the attachment portion 263, the user 10 does not have to carry a bag or other container of waste, which allows the user 10 to have at least one hand free while outdoors with the animal. To dispose of the animal waste, the user 10 may simply detach a plastic liner which holds the waste from the collection portion 255 and dispose of the plastic liner containing the waste, or simply dump the contents of the collection portion 255 into a garbage by turning the direct collection device 250 upside-down.

Referring to FIGS. 1-6, a method of animal waste collection comprising providing a wearable animal waste collection device 100 comprising a wearable structure 60 configured to be worn around a waist of a user 10, a top cover portion 40 secured by a first securing means 20 attached to the wearable structure 60, and a direct collection device 50 having a rigid collection portion 55 and a rigid handle portion 54, the direct collection device 50 being secured by a second securing means 30 attached to the wearable structure 60, wherein an animal waste is collected with the direct collection device 50 before the animal waste reaches a ground surface, wherein the animal waste is temporarily stored in the rigid collection portion 55 of the direct collection device 50. Moreover, a method of method of animal waste collection may comprise the steps of providing a wearable structure 260 configured to be worn by a user 10, the wearable structure 260 including an attachment portion 263 for removably engaging a direct collection device 250, wherein an animal waste is temporarily stored in a rigid collection portion 255 of the direct collection device 250.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A wearable animal waste collection device comprising:
   a wearable structure configured to be worn by a user, the wearable structure including an attachment portion for removably engaging a direct collection device, the direct collection device having a handle portion projecting therefrom, the handle portion having a first end and a second end, the first end being directly connected to the direct collection device and the second end being further away from the direct collection device than the first end, wherein a gripping surface is located between the first end and the second end, starting from the second end and extending towards the first end, the gripping surface being perpendicular to the direct collection device; and
   wherein the direct collection device is configured to at least one of: directly collect an animal waste before the animal waste reaches a ground surface, and store the animal waste;
   wherein the attachment portion of the wearable structure includes a first surface, a second surface, and a connection portion having an engagement structure, the engagement structure having a first portion that protrudes from the first surface of the attachment portion and a second portion that faces the first surface of the attachment portion, further wherein a gap is located between the second portion of the engagement structure and the first surface of the attachment portion when in an unconnected position with respect to the direct collection means;
   wherein the direct collection device includes a receiving portion proximate a bottom surface of the direct collection device, the receiving portion receiving the second portion of the engagement structure of the connection portion of the attachment portion.

2. The wearable animal waste collection device of claim 1, wherein the direct collection device includes a collection portion.

3. The wearable animal waste collection device of claim 2, wherein a top cover portion is hingedly connected to the collection portion, the top cover portion configured to be placed into a snug engagement with the collection portion after the animal waste is collected.

4. The wearable animal waste collection device of claim 1, wherein the direct collection device is lined with a disposable plastic liner.

5. The wearable animal waste collection device of claim 1, wherein the attachment portion includes a connection portion having an engagement surface, the connection portion configured to cooperate with a retaining structure to removably engage the wearable structure and the direct collection device.

6. The wearable animal waste collection device of claim 1, wherein the wearable structure comprises a band portion and at least one fastener.

7. A wearable animal waste collection device comprising:
a wearable structure configured to be worn around a waist of a user, wherein the wearable structure includes:
an attachment portion having a first surface and a second surface, and
a connection portion attached to the attachment portion, the connection portion having an engagement surface extending from the second surface of the attachment portion;
a direct collection means removably secured to the wearable structure, wherein the direct collection means includes:
a collection portion configured to store animal waste,
a handle portion attached to and projecting from the collection portion,
a top cover hingedly connected to the collection portion, and
a locking means for locking and unlocking the top cover;
wherein the first surface of the attachment portion is configured to conform to the user.

8. The wearable animal waste collection device of claim 7, wherein the collection portion is configured to receive an amount of animal waste before the animal waste reaches a ground surface when an animal has a bowel movement.

9. The wearable animal waste collection device of claim 8, wherein the collection portion is a rigid component.

10. The wearable animal waste collection device of claim 7, wherein the collection portion is lined with a disposable plastic liner.

11. The wearable animal waste collection device of claim 7, wherein the locking means includes an actuator that is displaced into an opening to unlock the top cover.

12. The wearable animal waste collection device of claim 11, wherein the actuator is at least one of rotated and slid into the opening.

13. The wearable animal waste collection device of claim 7, wherein the top cover includes a thumb latch.

14. The wearable animal waste collection device of claim 7, wherein the engagement surface of the connection portion is configured to structurally cooperate with a retaining structure of the direct collection means to removably secure the direct collection means with the wearable structure.

15. The wearable animal waste collection device of claim 7, wherein the wearable structure comprises a band portion and at least one fastener.

16. A method of animal waste collection comprising:
providing a wearable structure configured to be worn by a user, the wearable structure including an attachment portion for removably engaging a direct collection device, the direct collection device having a handle portion projecting therefrom, the handle portion having a first end and a second end, the first end being connected to the direct collection device and the second end being unconnected to the direct collection device, wherein a gripping surface is located between the first end and the second end, starting from the second end and extending towards the first end, the gripping surface being perpendicular to the direct collection device;
wherein an animal waste is temporarily stored in a rigid collection portion of the direct collection device;
wherein the attachment portion of the wearable structure includes a first surface, a second surface, and a connection portion having an engagement structure, the engagement structure having a first portion that protrudes from the first surface of the attachment portion and a second portion that faces the first surface of the attachment portion, further wherein a gap is located between the second portion of the engagement structure and the first surface of the attachment portion when in an unconnected position with respect to the direct collection means;
wherein the direct collection device includes a receiving portion proximate a bottom surface of the direct collection device, the receiving portion receiving the second portion of the engagement structure of the connection portion of the attachment portion.

17. The method of claim 16, wherein a top cover portion is hingedly connected to the collection portion, the top cover portion configured to be placed into a snug engagement with the collection portion after the animal waste is collected.

18. The method of claim 16, wherein the direct collection device is lined with a disposable plastic liner.

19. The method of claim 16, wherein the attachment portion includes a connection portion having an engagement surface, the connection portion configured to cooperate with a retaining structure to removably engage the wearable structure and the direct collection device.

20. The method of claim 16, further including actuating an actuator to lock and unlock an interior of the rigid collection portion.

* * * * *